(No Model.)

C. H. BENNETT.
FLY TRAP.

No. 394,906. Patented Dec. 18, 1888.

Witnesses:

Inventor:
Calvin H. Bennett
By James J. Sheehy
Attorney.

UNITED STATES PATENT OFFICE.

CALVIN H. BENNETT, OF BELOIT, KANSAS, ASSIGNOR OF ONE-HALF TO J. J. ABERCROMBIE AND C. R. HERRICK, OF SAME PLACE.

FLY-TRAP.

SPECIFICATION forming part of Letters Patent No. 394,906, dated December 18, 1888.

Application filed October 20, 1888. Serial No. 288,620. (No model.)

*To all whom it may concern:*

Be it known that I, CALVIN H. BENNETT, a citizen of the United States, residing at Beloit, in the county of Mitchell and State of Kansas, have invented certain new and useful Improvements in Fly-Catchers; and I do declare the following to be a full, clear, and exact description of the invention, such as will enable others skilled in the art to which it appertains to make and use the same.

This invention relates to machines for trapping flies and like insects, and the novelty will be fully understood from the following description and claims, when taken in connection with the accompanying drawings, in which—

Figure 1:
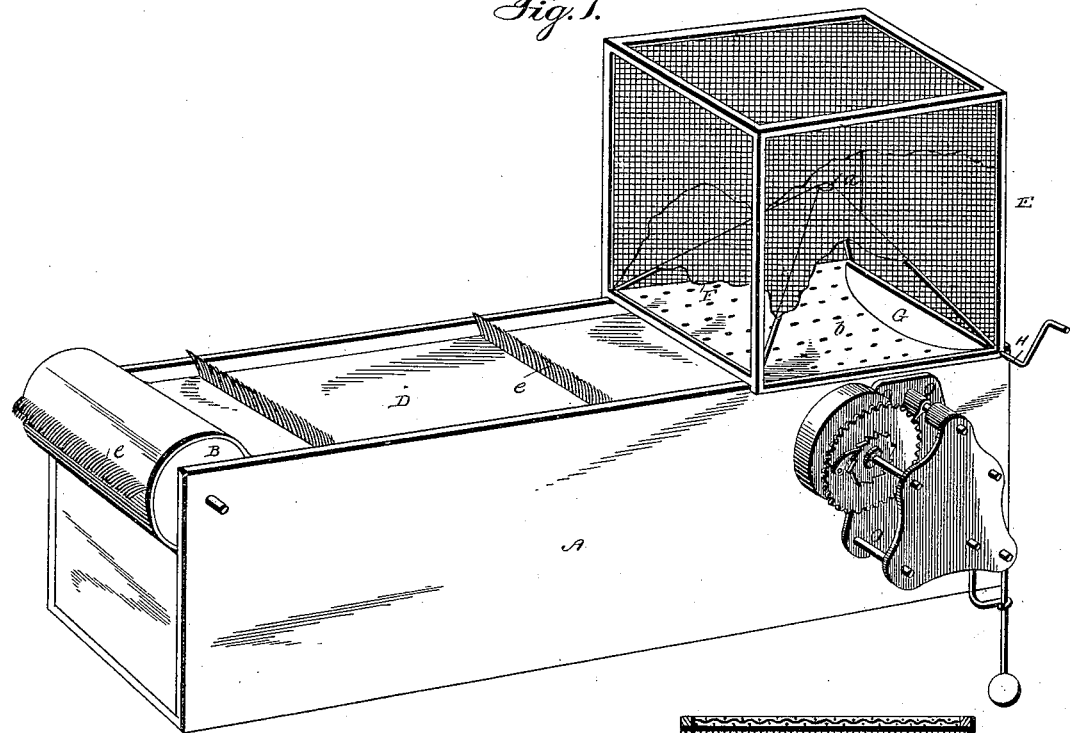
Figure 2:
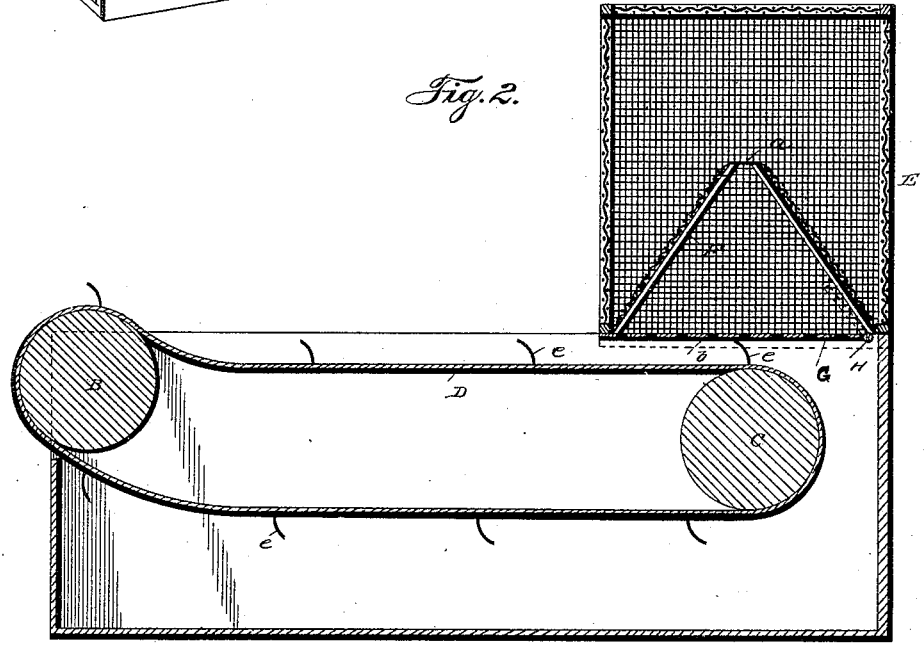

Figure 1 is a perspective view of a fly-catcher constructed according to my invention, and Fig. 2 is a central longitudinal sectional view of the same.

Referring by letter to the said drawings, A indicates a box or case, which may be of any suitable shape or size, but is preferably of an elongated rectangular form. This box has an open top, as shown, and journaled in the vertical walls at one end is a roller, B, and in the said wall near the opposite ends, but at a less altitude, is journaled a similar roller, C, over which travels an endless belt or carrier, D, for a purpose which will be presently explained.

E indicates a cage or holder arranged above the main case or box A and at one end thereof, to hold the flies after they have been trapped, and within this cage E is a hollow gauze cone, F, which is open at its upper reduced end, as shown at *a*, so as to form a communication between the said conical chamber and the main cage E. The cage, as well as the cone-chamber, has a perforated bottom, *b*, so as to admit light to the box at a point beneath the cage.

The endless belt or carrier D is provided at regular intervals with brushes or flexible strips *e*. These strips or brushes are arranged transversely upon the face of the carrier and at intervals equal to the length of the cage, so that as one of the strips or brushes, after passing beneath the perforated bottom of the same and takes its course around the roller C, the next brush will be brought to the forward lower edge of the cage, so that should a fly or any number of them attempt to escape, the said brushes or strips will close the interspace between the perforated bottom and the endless carrier, thereby excluding light at this point and making the only light visible that which comes through the perforated and gauze cage and cone therein. This will lead the flies to enter the said cone-chamber through a trap-door, which will be presently explained, and thence into the cage.

G indicates a trap-door, which is formed at the forward or outer edge of the perforated bottom *b*, and this door is fixed to a shaft, H, journaled in the main box or frame.

The rollers bearing the endless carrier may be driven by any suitable means, so as to impart to one of them a rotary motion. In the present illustration I have shown the driving mechanism as being that of clock-work, which may drive the belt for any desired time—from one day to eight days—the said clock mechanism as I have illustrated being geared with the shaft of the roller C.

As it is desirable to close the cage and cone-chamber when the carrier ceases to move, I have provided shaft H of the trap-door with a crank or handle, as indicated, so that when the said handle has been turned in one direction the door may be closed, and when turned in the opposite direction it may be opened.

In operation, a bait—such as molasses or the like—is placed upon the carrier between the flexible strips or brushes, and when the flies alight thereon they are unconsciously carried beneath the cage and perforated bottom thereof until they reach the trap-door, where the box below being darkened by the inclosure, they naturally fly into the cage above, where they are prevented from returning by the usual cone.

Having described my invention, what I claim is—

1. In a fly-trap, the combination, with a box or case, of an endless carrier arranged therein and having the flexible strips or brushes thereon, a cage arranged above the said carrier, and a trap-door in the bottom of the said cage, substantially as specified.

2. In a fly-trap, the combination, with a box or case, of a cage arranged above the same and an endless carrier adapted to travel beneath the said cage and having flexible strips or brushes arranged across the face of the carrier, substantially as specified.

In testimony whereof I affix my signature in presence of two witnesses.

CALVIN H. BENNETT.

Witnesses:
W. C. STEVENS,
C. P. STEVENS.